United States Patent [19]
Hart

[11] Patent Number: 5,606,725
[45] Date of Patent: Feb. 25, 1997

[54] BROADBAND NETWORK HAVING AN UPSTREAM POWER TRANSMISSION LEVEL THAT IS DYNAMICALLY ADJUSTED AS A FUNCTION OF THE BIT ERROR RATE

[75] Inventor: Gaylord A. Hart, Parker, Colo.

[73] Assignee: XEL Communications, Inc., Aurora, Colo.

[21] Appl. No.: 346,497

[22] Filed: Nov. 29, 1994

[51] Int. Cl.⁶ .................................................. H04N 7/14
[52] U.S. Cl. ............................ 455/5.1; 348/12; 348/13
[58] Field of Search ............................ 348/12, 6, 10, 348/13; 455/3.1, 4.1, 5.1, 6.1, 6.2, 6.3, 63, 68, 69, 70; 380/20; H04N 7/14

[56] References Cited

U.S. PATENT DOCUMENTS

| | | | |
|---|---|---|---|
| 3,750,022 | 7/1973 | Curry et al. | |
| 4,494,138 | 1/1985 | Shimp | |
| 4,512,033 | 4/1985 | Schrock | 348/12 X |
| 4,586,078 | 4/1986 | Citta et al. | |
| 4,982,440 | 1/1991 | Dufresne et al. | |
| 5,109,286 | 4/1992 | West, Jr. et al. | |
| 5,155,590 | 10/1992 | Beyers, II et al. | 348/12 |
| 5,208,666 | 5/1993 | Elkind | 348/192 |
| 5,225,902 | 7/1993 | McMullan, Jr. | 348/12 |

Primary Examiner—John K. Peng
Assistant Examiner—Nathan J. Flynn
Attorney, Agent, or Firm—Dorr, Carson, Sloan & Birney, P.C.

[57] ABSTRACT

A broadband network, such as a cable television (CATV) system, for two-way digital communications between a headend and a number of remote terminals dynamically adjusts the power of the upstream signal transmitted by each remote terminal to maintain the bit error rate (BER) of the upstream signal received by the headend below a predetermined limit. In particular, each remote terminal includes a data receiver for receiving signals from the headend (including control signals), and a data transmitter for transmitting digital data signals upstream to the headend. The power level of the data transmitter can be adjustably controlled by the control signals from the headend. The headend includes a data receiver for receiving upstream signals from each of the remote terminals, error detection circuitry for detecting errors in the upstream signals, a data transmitter for transmitting signals to the remote terminals (including control signals), and a processor for calculating the rate at which errors are detected by the error detection circuitry for each remote terminal. The processor directs the data transmitter to transmit control signals to: (1) increment the transmitting power level for any remote terminal having an error rate exceeding a predetermined limit; and (2) decrement the transmitting power level for any remote terminal having an error rate remaining below the limit.

20 Claims, 4 Drawing Sheets

BROADBAND NETWORK HAVING AN UPSTREAM POWER TRANSMISSION LEVEL THAT IS DYNAMICALLY ADJUSTED AS A FUNCTION OF THE BIT ERROR RATE

BACKGROUND OF THE INVENTION

1. Field of the Invention

The present invention relates generally to the field of cable television (CATV) systems and other broadband networks. More specifically, the present invention discloses a broadband network for two-way communications in which the headend terminal monitors the bit error rate of the upstream signal and dynamically adjusts the upstream power transmission level of each remote terminal to maintain a bit error rate below a predetermined limit.

2. Statement of the Problem

A typical CATV architecture employs a tree and branch structure for downstream distribution of video signals. This basic architecture can also be modified to accommodate two-way telephone communications and upstream communication of data for other interactive services. The headend, where program video signals originate, is often connected by fiber optics to a number of optical network units (ONU's). At the ONU, the optical signal is converted to an electrical signal and sent down the distribution network using conventional coaxial cables. This cable is split into different paths for distribution to multiple routes with multiple subscriber units (or remote terminals). If the branches become long enough, bidirectional line amplifiers (also known as trunk amplifiers, distribution amplifiers, bridger amplifiers, or line extenders) are inserted at intervals in the coaxial cable network to boost the signal in both directions. Alternatively, the coaxial cables can also be used to connect the headend to the ONU's, omitting the optical link.

Upstream signals from the remote terminals generally follow the reverse path. Once the return signal from the subscriber unit reaches the ONU, a diplex filter splits the return signal off and routes it through a return optical fiber back to the headend. Presently, most CATV networks transmit signals in the forward or downstream direction at frequencies from approximately 50 to 550 MHz. When the upstream direction is used for upstream telephony and other interactive services, the frequency range is typically in the range of approximately 5 to 40 MHz.

A number of unique problems are associated with maintaining acceptable signal quality while transmitting data upstream over a CATV network due to the ingress of impulse noise and other RF signals. RF interference signals in the 5–40 MHz band include CB radios, amateur radio transmitters, and shod-wave broadcasters. All of these interfering signals tend to be random in nature in at least four ways: duration in time; frequency of occurrence; signal strength; and RF frequency. Two methods are typically used in CATV systems to combat this interference—forward error correction and frequency hopping. Forward error correction utilizes transmission of extra bits in the signal to provide adequate redundancy in the received signal to detect errors and correct them at the receiving end. Several coding schemes exist for error correction, but all have the disadvantage of requiring extra bits to be included with the data. This requires additional error correction circuits at both the receiver and transmitter and additional channel bandwidth, which is a precious commodity in the CATV return spectrum.

Frequency hopping is a method whereby, when the signal quality degrades below acceptable limits, the transmitter and receiver are assigned a new frequency to avoid the interference. If the new frequency also contains interference, the process continues to another new frequency. This method has several disadvantages. First, blocks of open frequencies must be set aside for hopping. This results in reduced overall usage of the return path since at any given time some frequencies must be unused. Second, a complex method of supervision is required to coordinate all transmitters on the return path to ensure that only one transmitter is using a given frequency at any one time. Third, frequency hopping in the middle of a transmission can result in loss of data as the transmitter and receiver stabilize at the new frequency. If framing or a block structure is used in the bit stream, additional data may be lost while the receiver reframes to the incoming data at the new frequency. Fourth, the transmitter must be turned off during the hop to prevent it from interfering with communications in frequency channels between the beginning channel and the new channel. This adds complexity and expense to each transmitter.

A second concern is the summation of noise and ingress in the upstream signal path. The upstream transmission path is unique in that noise from each of the individual legs of the CATV network sums together at the point where the legs join, typically at the tap, power dividers, and other signal distribution devices that serve to split the signal in the downstream direction and combine the signal in the upstream direction. This additive noise and ingress make error-free upstream transmission even more difficult. Typical methods used to combat this summation require the use of RF switches or filters to disconnect upstream legs that do not currently have an actively transmitting upstream device, thus disconnecting the noise and ingress as well. This approach is expensive and is not practical in systems in which many upstream transmitters need to be simultaneously active.

Various other approaches have also been used in the past to reduce upstream noise in CATV systems, including the following:

| Inventor | Pat. No. | Issue Date |
| --- | --- | --- |
| Curry et al. | 3,750,022 | July 31, 1973 |
| Shimp | 4,494,138 | Jan. 15, 1985 |
| Cilia et al. | 4,586,078 | Apr. 29, 1986 |
| Dufresne et al. | 4,982,440 | Jan. 1, 1991 |
| West et al. | 5,109,286 | Apr. 28, 1992 |

Curry et al. disclose a system for minimizing upstream noise in a subscriber response CATV system. If the headend locates a noise source, it commands selected phantom subscriber units in the system to close RF switches to allow only desired upstream transmissions to be passed to the headend and to switch out all other upstream transmission paths not being used.

Shimp discloses a segmented upstream management system for a bidirectional cable television network. Upstream signals from a plurality of subscriber groups are carried by a segmented return-only trunk. The upstream signals for each subscriber group are assigned a frequency band so that groups can be "stacked" for transport. The headend provides down-conversion of the upstream signals.

Citta et al. disclose a CATV system in which upstream signals are transmitted at frequencies that are displaced relative to harmonics of the video frequencies.

Dufresne et al. disclose a two-way CATV network in which narrow-band filters in the distribution lines reduce upstream noise. The filters sense the upstream signal energy and open in the event the energy exceeds a predetermined threshold.

West et al. disclose an example of a reverse path manifold system for combining upstream signals from a plurality of subscribers in a CATV network.

3. Solution to the Problem

None of the prior art references uncovered in the search show a CATV system in which the headend terminal monitors the bit error rate (BER) of the upstream signal from each remote terminal and dynamically adjusts the transmitting power level of each remote terminal to maintain the BER below a predetermined limit.

SUMMARY OF THE INVENTION

This invention provides a broadband network, such as a cable television (CATV) system, for two-way digital communications between a headend and one or more remote terminals that dynamically adjusts the power of the upstream signal transmitted by each remote terminal to maintain the bit error rate (BER) of the upstream signal received by the headend below a predetermined limit. In particular, each of the remote terminals includes a data receiver for receiving signals from the headend (including control signals), and a data transmitter for transmitting digital data signals to the headend. The power level of the data transmitter can be adjustably controlled by the control signals from the headend. The headend includes a data receiver for receiving digital signals from each of the remote terminals, error detection circuitry for detecting errors in the upstream signals, a data transmitter for transmitting signals to the remote terminals (including control signals), and a processor for calculating the rate at which errors are detected by the error detection circuitry. The processor directs the data transmitter to transmit control signals to: (1) increment the transmitting power level for any remote terminal having an error rate exceeding a predetermined limit; and (2) decrement the transmitting power level for any remote terminal having an error rate remaining below the limit for a predetermined period of time.

A primary object of the present invention is to provide a broadband network having an improved method of compensating for variations in the noise level in the upstream signal path.

Another object of the present invention is to provide a broadband network that dynamically adjusts to compensate for variations in the upstream noise level, and therefore minimizes manual adjustments.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
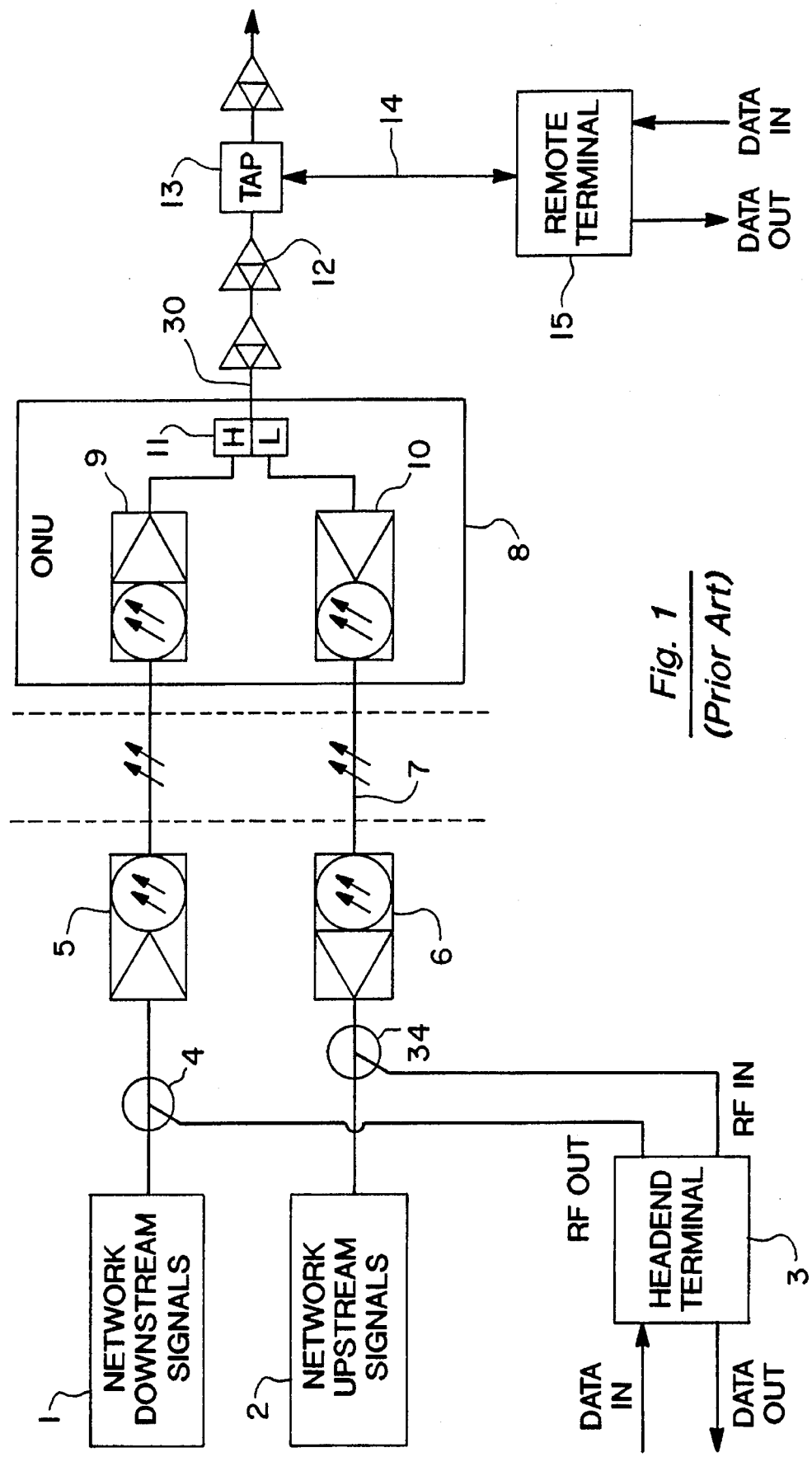
FIG. 1 is a schematic block diagram providing an overview of a conventional CATV system.

FIG. 1 provides an overview of a conventional CATV system for distribution of video signals that also provides two-way telephone communications. The following discussion focuses on a CATV system as one example of a broadband network in which the invention can be implemented. It is anticipated that CATV networks will provide a major field of use for the present invention due to the large number of such systems in existence. However, it should be expressly understood that the invention can be applied to other types of broadband networks, including local area networks (LAN's) used to interconnect computers. The present invention can be employed for any type of two-way data communications and is not limited to CATV systems or telephone communications.

Returning to the CATV system shown in FIG. 1, video signals in the range of approximately 50 to 550 MHz are distributed downstream from a conventional program source 1. The video signal is transmitted from the headend over fiber optics 7 to one or more optical network units (ONU's) 8. At each ONU 8, the optical signal is converted to an electrical signal that is further distributed over a plurality of coaxial cables 30 extending to subscribers. Again, the optical link between the headend and each ONU 8 could be replaced with a coaxial cable. The coaxial cable 30 downstream from each ONU 8 generally has a tree structure with a number of branches. Line amplifiers 12 are located at intervals along the coaxial cable network 30 downstream from each ONU 8 to boost the signal. Assuming the CATV system supports interactive services, each line amplifier 12 must be bidirectional and typically includes separate amplifiers for downstream and upstream signal paths. It should be noted that passive coaxial networks have been implemented without line amplifiers 12 in systems using smaller coaxial nodes. Each subscriber is tied to the coaxial cable 30 by means of a tap 13 and a short coaxial drop cable 14 extending to the subscriber's remote terminal 15.

Some conventional CATV systems extend this basic architecture to provide two-way data communications as well as distribution of video signals. The video signals to be distributed over the CATV system are supplied by conventional TV programming sources and converted to the appropriate frequency bands for reception by subscriber televisions sets (i.e., approximately 50 MHz to 550 MHz). If the two-way data communications capability is used to provide telephone service, the headend terminal 3 interfaces with external telephone switching equipment (e.g., a local telephone operating company central office or switch) to provide telephone service to the CATV system's subscribers. In one embodiment, the switch transmits and receives telephone signals with the headend terminal 3 using the conventional T1 format that is widely used in the United States. However, it should be expressly understood that any number of alternative formats are widely known in the telecommunications industry and could be substituted to carry telephone communications in the present invention. In addition, it should be expressly understood that broadband networks can be employed for any type of two-way data communications and are not limited to telephone communications.

Figure 2:
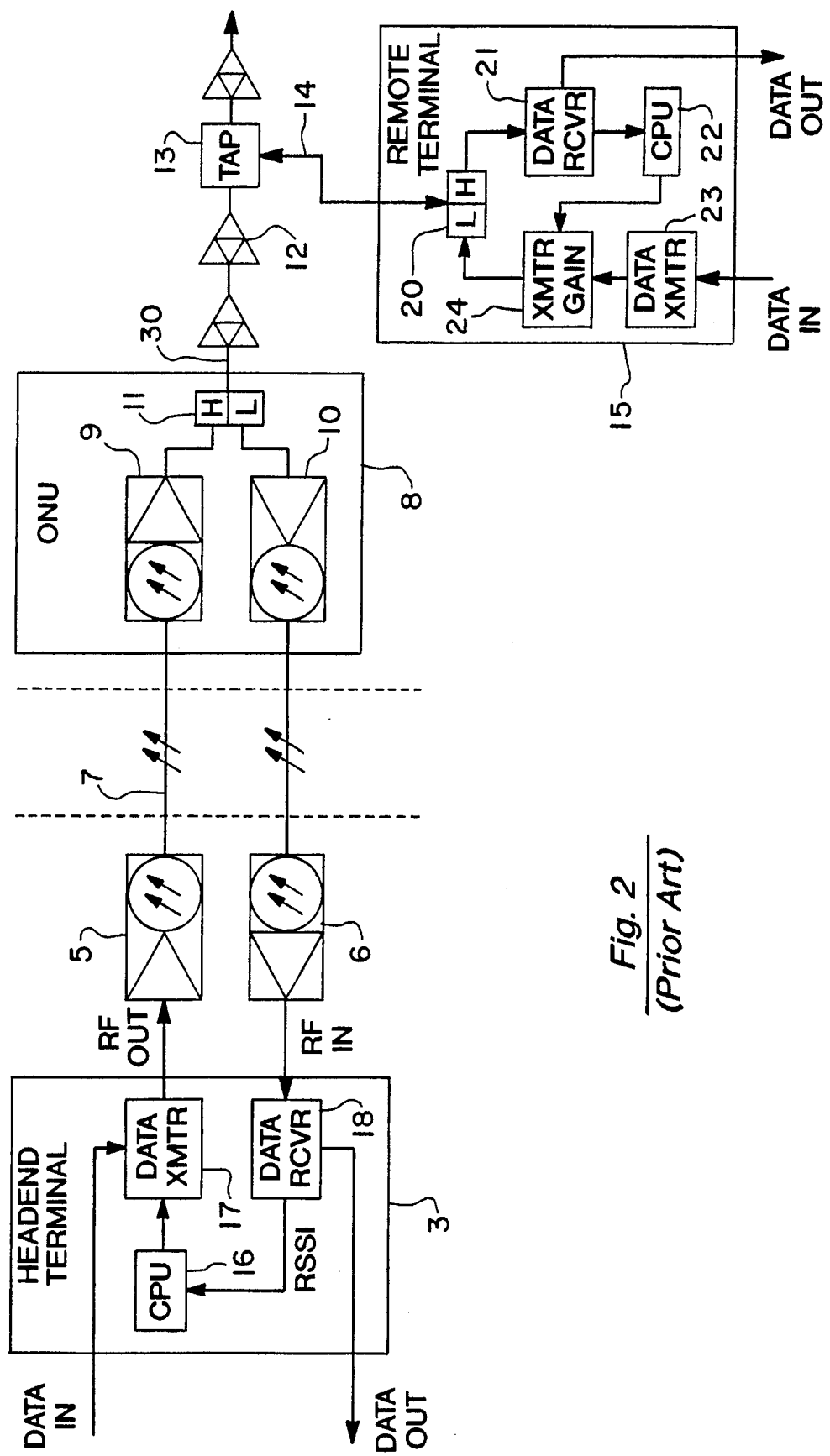
FIG. 2 is a more detailed schematic block diagram of a prior art CATV system showing one conventional method for regulating the transmitting power level of each remote terminal.
Figure 3:
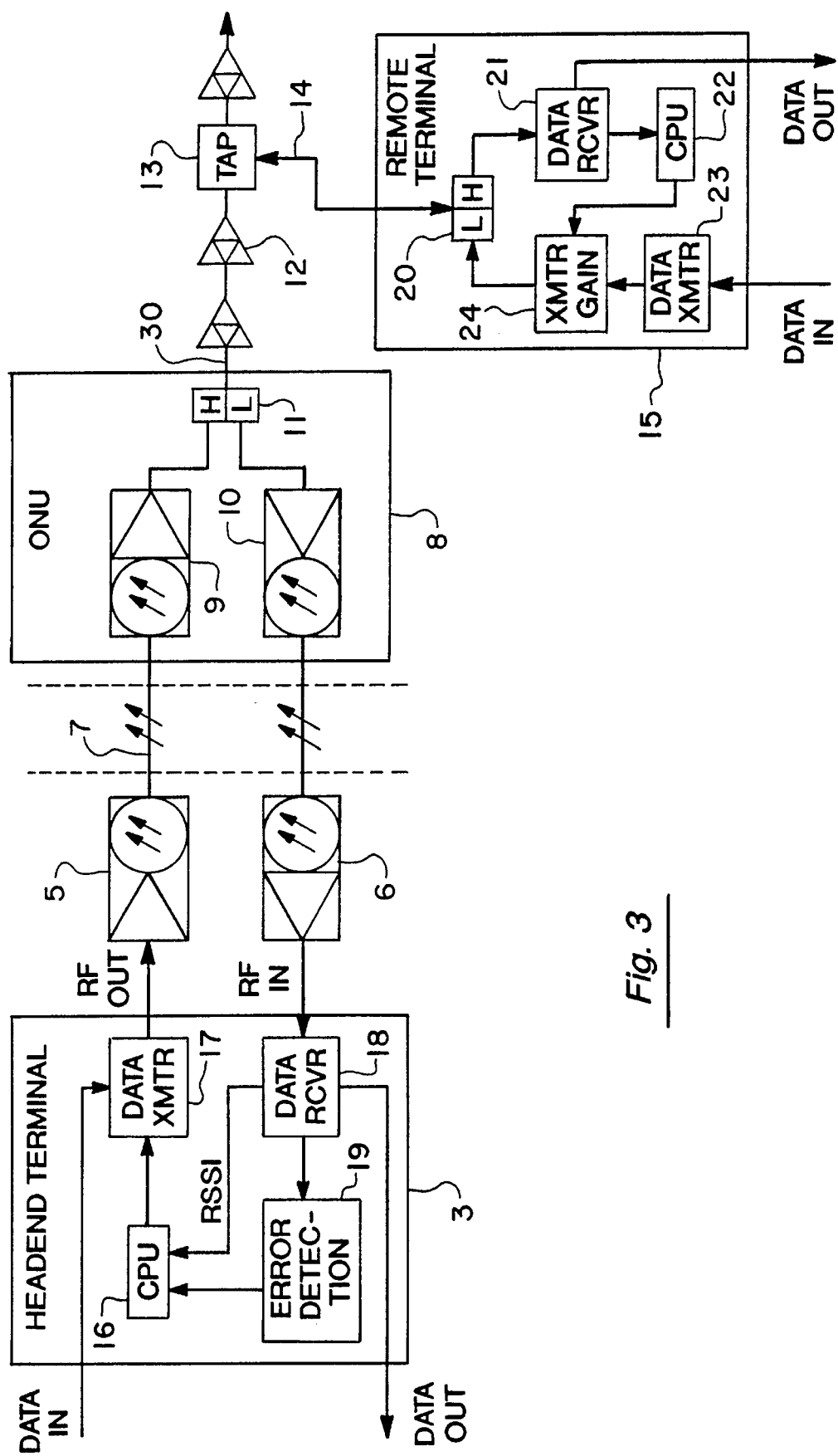
FIG. 3 is a schematic block diagram of a CATV system implementing the present invention.

The data signal to be communicated downstream to subscribers is first modulated by an RF transmitter 17 shown in FIGS. 2 and 3 to a predetermined frequency band. In one embodiment, the downstream data signal is assigned to an unused channel within the frequency band of 50 to 550 MHz that is otherwise allocated for video signals. However, the downstream data signal could be placed above or below the video frequency band. The upstream data signal is often transmitted in a 6-MHz band between 5 MHz and 40 MHz.

Returning to the downstream path of the headend as shown in FIG. 1, the modulated data signal is combined with the video signal by a radio frequency combiner 4 and then converted into an optical signal by a fiber optic transmitter 5 (e.g., a laser) so that it can be transmitted through fiber optics 7 to the appropriate ONU 8. The upstream path through the headend receives the upstream data signals that are transmitted upstream by the ONU's 8 over the fiber optics 7. These optical signals are first converted to corresponding electrical signals by a fiber optic receiver 6. An RF decombiner 34 then separates the upstream telephone signal from other interactive service signals. For example, this can be accomplished by bandpass filtering of the upstream signal or with an RF directional coupler. The upstream interactive services signal is passed to an external control system 2 for conventional handling. The upstream data signal is demodulated by a data receiver 18, as shown in FIGS. 2 and 3. In systems providing telephone communications, the headend receiver 18 also converts the upstream data signal to T1 format to interface with the external switching equipment.

FIG. 3 also includes a block diagram of an ONU 8. In the ONU's downstream signal path, a fiber optic receiver 9 converts the optical signal transmitted downstream over the fiber optics 7 from the headend into corresponding electrical signals and transmits these signals downstream through the coaxial cable network 30 to the remote terminals 15. The ONU's upstream path includes a diplex filter 11 to separate the upstream data signals from the other signals that are present on the coaxial cable network 30. The upstream signals are then converted to optical signals by a fiber optic transmitter 10 and carried over the fiber optic cable 7 to the headend.

FIGS. 2 and 3 also show a block diagram of a subscriber remote terminal 15 connected by a tap 13 to the coaxial cable network 30. The downstream signal is separated from the upstream signal by a diplex filter 20. A radio frequency receiver 21 receives the downstream data signal and converts it into the appropriate format for use by the remote terminal. For example, in the case of a broadband network that provides telephone service, the remote terminal includes circuitry to convert the downstream data from digital format into an analog telephone signal. The data receiver 21 also receives and demodulates control signals that have been sent downstream by the headend terminal 3 to control operation of the remote terminal 15. These control signals are forward to the CPU 22 for execution.

In the upstream signal path for the remote terminal 15, the digital data is modulated by a transmitter 23 into a predetermined frequency band below the video signals (i.e., less than approximately 40 MHz). The transmitting power level of the transmitter 23 is adjustably controlled by transmitter gain control circuitry 24 as shown in FIGS. 2 and 3. This, in turn, is controlled by the CPU 22 in response to control signals received from the headend terminal 3, as will be described below.

The upstream telephone signal is carried in a second assigned frequency band between approximately 5–40 MHz using a frequency division multiple access (FDMA) scheme to minimize interference between remote terminals. Alternatively, the upstream telephone data can be encoded using a code division multiple access (CDMA) scheme. This is similar to CDMA schemes used in some types of cellular telephone systems to allow multiple users to share common frequency bands. A unique binary key is assigned to each subscriber. Alternatively, a time division multiple access (TDMA) could be substituted. It is also possible to combine CDMA, FDMA, or TDMA schemes to provide greater capacity in a limited frequency band.

In general, a nominally optimum upstream transmission signal level exists at which the system performs best. This signal level is typically determined by using the lowest possible upstream transmitter power level consistent with a good bit error rate (BER) and consistent with the signal levels of any other services using the return path. A lower transmitter signal level is desirable because it reduces distortions generated by the amplifiers and lessens the probability of interference with other services sharing the CATV network on other frequencies. However, lower transmitter signal levels also tend to yield lower carrier-to-noise (C/N) ratios that, in turn, raise the BER.

In a typical CATV network, the upstream transmitter signal level for each remote terminal 15 is set so that the resulting signal level at the input of the first return amplifier (e.g., line amplifier 12 or ONU transmitter 10) approximates a desired reference value. The input for this return amplifier serves as a reference point for establishing appropriate signal levels for the return path as a whole. It is necessary to establish a reference signal level at this point because the cumulative signal losses between the output of the remote terminal 15 and the input of the first return amplifier cannot be predetermined, will vary from subscriber to subscriber, and may vary with time due to the subscriber adding splitters or cable within the home. This method of establishing optimum upstream signal levels requires that the power level of the remote terminal transmitter 15 be dynamically adjustable to compensate for losses between the output of the remote terminal transmitter 15 and the first return amplifier.

FIG. 2 provides a schematic block diagram of one prior art method for regulating the upstream transmitting power level of each remote terminal 15. The headend receiver 18 measures the magnitude of the upstream signal received from each remote terminal 15 and generates a received signal strength indicator (RSSI) that is communicated to the headend CPU 16, which continually monitors the RSSI for each remote terminal. If it is assumed that the gain or loss of the system is relatively fixed between the input of the first return amplifier and the headend receiver 18, it is possible to calculate the effective upstream power level at the input to the first return amplifier as a function of the RSSI signal at the headend receiver. Therefore, the CPU 16 can calculate the input level to the first return amplifier for each remote terminal 15. If this level is not at the optimal point, the CPU 16 can direct the headend transmitter 17 to send commands via the downstream data link to the appropriate remote terminal 15 to adjust the gain 24 of the remote terminal's transmitter 23 upward or downward. The power level of each upstream transmitter is adjusted via this feedback link until the optimum signal level has been reached at the input of the first return amplifier 10 or 12, as computed by the CPU 16 based on the RSSI measured by the headend receiver 18. Any further adjustments to the output level of the remote terminal transmitter from this point on are to maintain a nominal optimal signal level at the input of the first return amplifier as measured by the RSSI at the headend terminal 3.

It is widely recognized that BER is a function of the C/N ratio, which in turn is a direct function of the transmitter output power level. In fact, forward error correction techniques (e.g., Hamming codes, Reed-Solomon codes, etc.) are often quantified by their processing gain, or equivalency to increased transmitter output power. The implication is that increased transmitter power in the presence of interfering signals can be seen as the corollary to utilizing an equivalent forward error correction technique to achieve a good BER.

The BER can be affected by impulse noise and other RF signals which influence the entire CATV network, as previously discussed. Given the randomness of interfering signals and the relationship of BER as a function of transmitter power, the optimum upstream transmitter level should be viewed as a function of the dynamic nature of the entire upstream signal path. This implies that the quality of upstream communications can be improved by dynamically adjusting the upstream transmitter signal level based on BER performance itself.

FIG. 3 shows a schematic block diagram of a CATV system embodying the present invention. Error detection circuitry 19 has been added to the headend terminal 3 to monitor the upstream signal in real time for any errors. This can be readily accomplished utilizing a relatively small number of cyclic redundancy check (CRC) bits, checksum bits, or parity bits. These additional error detection bits can be embedded in the framing or message structure already being used to communication data in the upstream direction. Any errors that are detected by the error detection circuitry 19 are reported to the headend CPU 16.

Figure 4:
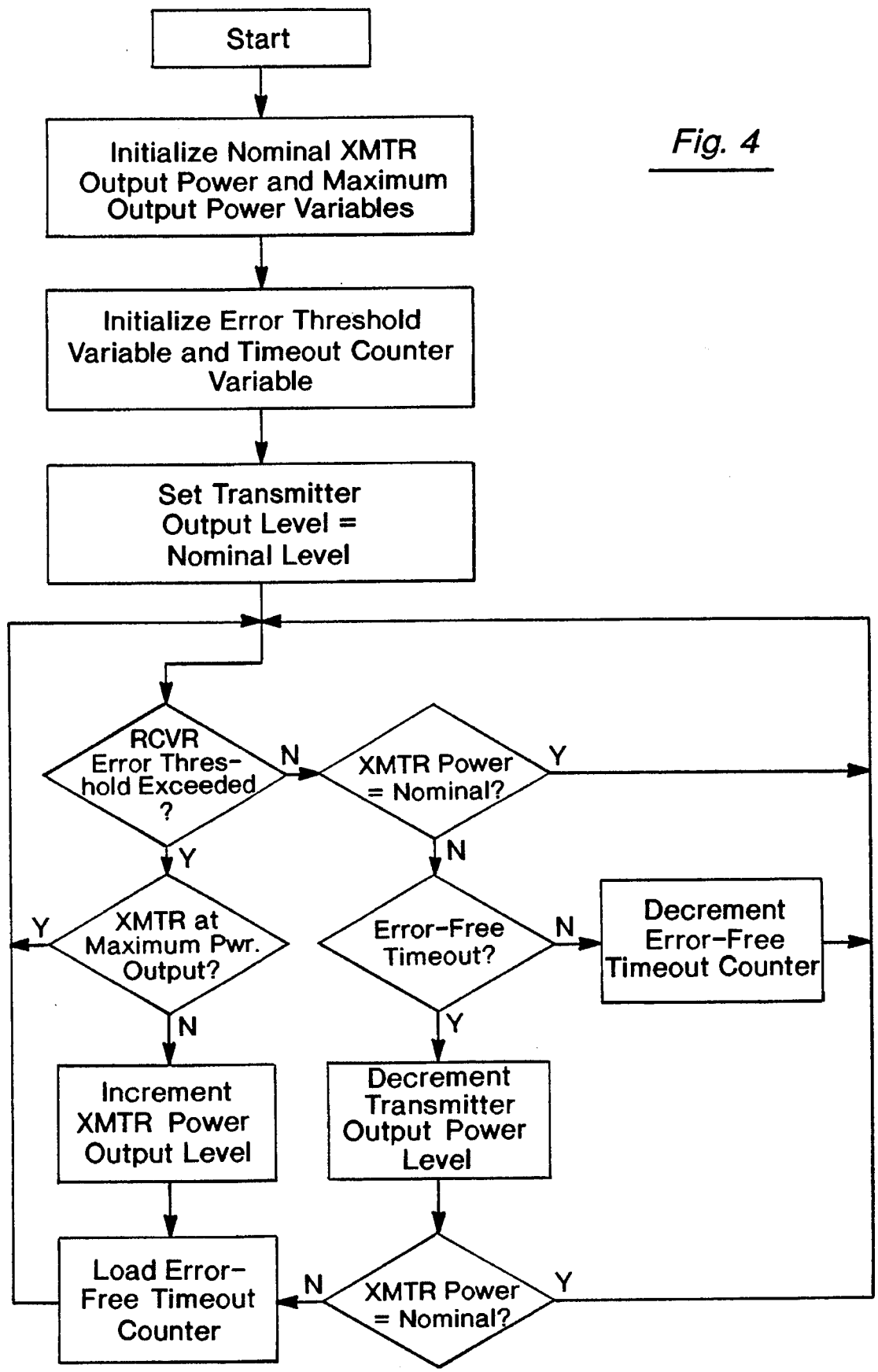
FIG. 4 is a flow chart of the procedure used by the headend terminal to regulate the transmitting power level of each remote terminal.

FIG. 4 is a flow chart of the process used by the headend CPU 16 to regulate the transmitting power level of each remote terminal 15 to maintain an acceptable BER. The remote terminal transmitters are initially set to a nominal optimal output level using the traditional approach previously discussed. Variables indicating the maximum and nominal power levels for the remote unit transmitter and the variables used to calculate the BER are also initialized. When the BER exceeds a predetermined threshold, the CPU 16 directs the remote terminal 15 to incrementally adjust its transmitting power level upward. This continues over successive iterations if the BER remains above the threshold value, until either the maximum allowable transmitter power level is reached or until the BER falls below the threshold value.

If a predetermined period of time passes in which the BER remains below a threshold value, the CPU 16 instructs the remote terminal 15 to decrement its transmitter power level to determine whether the interfering signal has either gone away or has been reduced in severity. This threshold can be either the same threshold value discussed above, or a second lower threshold to provide a deadband between the two thresholds in which the power level is neither incremented or decremented. This continues over successive iterations if the BER remains below the threshold value, until either the transmitter power level is reduced to its original nominal output level or until the BER rises to the threshold value. This technique of dynamic power adaptation maintains minimum transmitter output power consistent with maintaining an acceptable BER for the data link.

The algorithm illustrated in FIG. 4 is merely example of the many possible variations that could be used to regulate the power level of the remote terminal transmitters. For example, the error threshold can be based on the absolute number of errors, the number of messages containing errors, the number of seconds containing errors, or the average number of errors during a given period of time. Similarly, the time-out counter can be based on time, number of messages, byte count, etc.

The above disclosure sets forth a number of embodiments of the present invention. Other arrangements or embodiments, not precisely set forth, could be practiced under the teachings of the present invention and as set forth in the following claims.

I claim:

1. In a broadband network for two-way communications between a headend and at least one remote terminal including downstream data transmitted from the headend to the remote terminal and upstream data transmitted from the remote terminal to the headend, the improvement comprising:

said remote terminal having:

(a) receiving means for receiving signals from said headend, including control signals; and (b) transmitting means for transmitting said upstream data to said headend as digital signals including error detection bits, said transmitting means having a transmitting power level adjustably controlled by said control signals from said headend; and said headend having:

(a) receiving means for receiving said digital signals from said remote terminals;

(b) error detection means for detecting errors in said digital signals received by said receiving means from each of said remote terminals using said error detection bits;

(c) transmitting means for transmitting signals to said remote terminals, including said control signals; and (d) a processor associated with said error detection means for calculating the rate at which errors are detected by said error detection means for each remote terminal, said processor directing said transmitting means to transmit control signals to increase said transmitting power level of any remote terminal having an error rate exceeding a predetermined limit.

2. The broadband network of claim 1 wherein said headend processor further directs said transmitting means to transmit control signals to decrement said transmitting power level of any remote terminal having an error rate remaining below a predetermined limit.

3. The broadband network of claim 2 wherein said headend processor progressively decrements said transmitting power level of any remote terminal while said error rate remains below said limit until a predetermined minimum power level is reached.

4. The broadband network of claim 2 wherein said headend processor progressively increments said transmitting power level of any remote terminal while said error rate exceeds said limit until a predetermined maximum power level is reached.

5. The broadband network of claim 1 wherein said error detection bits comprise checksum bits.

6. The broadband network of claim 1 wherein said error detection bits comprise cyclic redundancy check (CRC) bits.

7. The broadband network of claim 1 wherein said error detection bits comprise parity bits.

8. The broadband network of claim 1 wherein said network comprises a cable television (CATV) system for distribution of video signals from said headend to said remote terminals and for two-way digital data communications between said headend and said remote terminals.

9. In a broadband network for two-way communications between a headend and at least one remote terminal including downstream data transmitted from the headend to the remote terminal and upstream data transmitted from the remote terminal to the headend, the improvement comprising:

said remote terminal having:
(a) receiving means for receiving signals from said headend, including control signals;
(b) transmitting means for transmitting said upstream data to said headend as digital signals including error detection bits; and
(c) a processor for adjustably controlling the transmitting power level of said transmitting means in response to said control signals received by said receiving means; and said headend having:
(a) receiving means for receiving said digital signals from said remote terminals;
(b) error detection means for detecting errors in said digital signals received by said receiving means from each of said remote terminals using said error detection bits;
(c) transmitting means for transmitting signals to said remote terminals, including said control signals; and
(d) a processor associated with said error detection means for calculating the rate at which errors are detected by said error detection means for each remote terminal, said processor directing said transmitting means to transmit control signals to:
  (1) increment said transmitting power level for any remote terminal having an error rate exceeding a predetermined limit; and
  (2) decrement said transmitting power level for any remote terminal having an error rate remaining below a predetermined limit.

10. The broadband network of claim 9 wherein said headend processor progressively decrements said transmitting power level of any remote terminal while said error rate remains below said limit until a predetermined minimum power level is reached.

11. The broadband network of claim 9 wherein said headend processor progressively increments said transmitting power level of any remote terminal while said error rate exceeds said limit until a predetermined maximum power level is reached.

12. The broadband network of claim 9 wherein said error detection bits comprise checksum bits.

13. The broadband network of claim 9 wherein said error detection bits comprise cyclic redundancy check (CRC) bits.

14. The broadband network of claim 9 wherein said error detection bits comprise parity bits.

15. The broadband network of claim 9 wherein said network comprises a cable television (CATV) system for distribution of video signals and for two-way digital data communications between said headend and said remote terminals.

16. In a cable television (CATV) system for distribution of video signals and for two-way digital telephone communications between a headend and a plurality of remote terminals including downstream telephone data transmitted from the headend to the remote terminal and upstream telephone data transmitted from the remote terminal to the headend, the improvement comprising:

said remote terminals having:
(a) receiving means for receiving signals from said headend, including control signals;
(b) transmitting means for transmitting said upstream telephone data to said headend as digital signals including error detection bits; and
(c) a processor for adjustably controlling the transmitting power level of said transmitting means in response to said control signals received by said receiving means; and said headend having:
(a) receiving means for receiving said upstream telephone data from said remote terminals;
(b) error detection means for detecting errors in said upstream telephone data received by said receiving means from each of said remote terminals using said error detection bits;
(c) transmitting means for transmitting signals to said remote terminals, including said control signals; and
(d) a processor associated with said error detection means for calculating the rate at which errors are detected by said error detection means for each remote terminal, said processor directing said transmitting means to transmit control signals to:
  (1) increment said transmitting power level for any remote terminal having an error rate exceeding a predetermined limit, said transmitting power level being progressively incremented while said error rate remains above said limit until a predetermined maximum power level is reached; and
  (2) decrement said transmitting power level for any remote terminal having an error rate remaining below a predetermined limit, said transmitting power level being progressively decremented while said error rate remains below said limit until a predetermined minimum transmitting power level is reached.

17. The CATV system of claim 16 wherein said error detection bits comprise checksum bits.

18. The CATV system of claim 16 wherein said error detection bits comprise cyclic redundancy check (CRC) bits.

19. The CATV system of claim 16 wherein said error detection bits comprise parity bits.

20. The CATV system of claim 16 wherein said network comprises a cable television (CATV) system for distribution of video signals and for two-way digital data communications between said headend and said remote terminals.

* * * * *